United States Patent
Moon et al.

(10) Patent No.: US 8,604,403 B2
(45) Date of Patent: Dec. 10, 2013

(54) AUTO-FOCUSING APPARATUS AND AUTO-FOCUSING METHOD USING THE SAME

(75) Inventors: Chang-Yun Moon, Yongin (KR); Hee-Seong Jeong, Yongin (KR); Sun-Hwa Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 265 days.

(21) Appl. No.: 13/236,999

(22) Filed: Sep. 20, 2011

(65) Prior Publication Data

US 2012/0305746 A1    Dec. 6, 2012

(30) Foreign Application Priority Data

May 31, 2011    (KR) .................. 10-2011-0052385

(51) Int. Cl.
*F21V 14/06*    (2006.01)

(52) U.S. Cl.
USPC ........................................ 250/201.2; 345/162

(58) Field of Classification Search
USPC ........................................ 250/201.2; 345/633
See application file for complete search history.

(56) References Cited

U.S. PATENT DOCUMENTS

2011/0213664 A1*    9/2011    Osterhout et al. ......... 705/14.58

FOREIGN PATENT DOCUMENTS

| JP | 2007-024733 A | 2/2007 |
| KR | 10-2001-0092123 A | 10/2001 |
| KR | 10-2009-0058772 A | 6/2009 |

* cited by examiner

*Primary Examiner* — Tony Ko
(74) *Attorney, Agent, or Firm* — Lee & Morse, P.C.

(57) ABSTRACT

An auto-focusing apparatus and method, the apparatus including an emission unit, the emission unit being configured to irradiate light on the organic light-emitting display apparatus; an optical system between the organic light-emitting display apparatus and the emission unit, the optical system being configured to adjust a position of the optical system on an optical axis and focus the irradiated light on the pixel unit; a light-receiving unit, the light-receiving unit being configured to receive light reflected by the organic light-emitting display apparatus and measure an intensity and a wavelength of the reflected light; and a controller, the controller being configured to receive the intensity of light measured by the light-receiving unit, control the position of the optical system, determine that the auto-focusing apparatus is focusing light onto the pixel unit when the intensity of light received by the light-receiving unit is a maximum value, and determine the position of the optical system as an optimal focal length.

17 Claims, 4 Drawing Sheets

AUTO-FOCUSING APPARATUS AND AUTO-FOCUSING METHOD USING THE SAME

CROSS-REFERENCE TO RELATED PATENT APPLICATIONS

This application claims the benefit of Korean Patent Application No. 10-2011-0052385, filed on May 31, 2011, in the Korean Intellectual Property Office, the disclosure of which is incorporated herein in its entirety by reference.

BACKGROUND

1. Field of the Invention

Embodiments relate to an auto-focusing apparatus that automatically focuses light onto a pixel unit so as to be used in evaluating optical characteristics of an organic light-emitting display apparatus.

2. Description of the Related Art

Display apparatuses may include flat panel display apparatuses that are portable and have a thin profile. Among flat panel display apparatuses, electroluminescent display apparatuses are self-luminescent type display apparatuses that have larger viewing angles, better contrast characteristics, and faster response rates than the other display apparatuses, and thus, have drawn attention as a next-generation display apparatus. In addition, organic light-emitting display apparatuses (including an emission layer formed of an organic material) may have higher brightness, more stable driving voltage, and faster response rates than inorganic light-emitting display apparatuses and may provide multi-color images. Such organic light-emitting display apparatuses may include a pixel unit including an organic light-emitting device. For example, the organic light-emitting device may employ a resonant structure and maximizes optical extraction efficiency.

SUMMARY

An auto-focusing apparatus for automatically focusing light onto a pixel unit of an organic light-emitting display apparatus in which the pixel unit includes an organic light-emitting device that employs a resonant structure, the auto-focusing apparatus including an emission unit, the emission unit being configured to irradiate light on the organic light-emitting display apparatus; an optical system between the organic light-emitting display apparatus and the emission unit, the optical system being configured to adjust a position of the optical system on an optical axis and focus the irradiated light on the pixel unit; a light-receiving unit, the light-receiving unit being configured to receive light reflected by the organic light-emitting display apparatus and measure an intensity and a wavelength of the reflected light; and a controller, the controller being configured to receive the intensity of light measured by the light-receiving unit, control the position of the optical system, determine that the auto-focusing apparatus is focusing light onto the pixel unit when the intensity of light received by the light-receiving unit is a maximum value, and determine the position of the optical system as an optimal focal length.

The auto-focusing apparatus may further include an optical path conversion unit on the optical axis between the optical system and the emission unit, the optical path conversion unit being configured to change a path of the reflected light and transfer the light to the light-receiving unit.

The emission unit may include a laser generator or a light emitting diode (LED) device.

The emission unit may be configured to irradiate light having a wavelength in a red region or light having a wavelength in a blue region.

The emission unit may include a first emission unit configured to irradiate light having a wavelength in a red region; and a second emission unit configured to irradiate light having a wavelength in a blue region, and the first emission unit and the second emission unit may be configured to irradiate light on the organic light-emitting display apparatus at a predetermined time interval.

The optical system may include an objective lens and a lens movement unit that is configured to adjust a position of the objective lens, and the controller may be configured to control the lens movement unit to control the position of the objective lens.

The auto-focusing apparatus may further include an optical splitter on the optical axis between the optical system and the emission unit, the optical splitter being configured to split light irradiated by the emission unit and transfer the split light to the light-receiving unit.

The light-receiving unit may be configured to measure an intensity and a wavelength of the split light, and the controller may be configured to receive the intensity and wavelength of the split light measured by the light-receiving unit and compare the intensity and wavelength of the split light with the intensity and wavelength of the reflected light to determine whether there is noise in the reflected light.

The auto-focusing apparatus may be configured to automatically focus light onto the pixel unit when the organic light-emitting display apparatus is in a state where the organic light-emitting device does not emit light.

The organic light-emitting display apparatus may further include at least one optical member on the pixel unit.

An auto-focusing method using an auto-focusing apparatus for automatically focusing light onto a pixel unit of an organic light-emitting display apparatus in which the pixel unit includes an organic light-emitting device that employs a resonant structure, the auto-focusing method including irradiating light on the organic light-emitting display apparatus such that the irradiating is performed by an emission unit; focusing the irradiated light onto the pixel unit while the irradiated light passes through an optical system; reflecting the irradiated light on the organic light-emitting display apparatus; transferring the reflected light to a light-receiving unit; receiving the reflected light and measuring an intensity and a wavelength of the reflected light such that the receiving and the measuring is performed by the light-receiving unit; and determining that the auto-focusing apparatus is focusing light onto the pixel unit when the intensity of received light measured by the light-receiving unit is a maximum value and determining a position of the optical system as an optimal focal length.

Transferring the reflected light to the light-receiving unit may include changing a path of the reflected light by using an optical path conversion unit.

Light irradiated by the emission unit may have a wavelength in a red region or may have a wavelength in a blue region.

a first emission unit of the emission unit may irradiate light having a wavelength in a red region; a second emission unit of the emission unit may irradiate light having a wavelength in a blue region, and the first emission unit and the second emission unit may irradiate light on the organic light-emitting display apparatus at a predetermined time interval.

The auto-focusing method may further include splitting light irradiated by the emission unit and transferring the split light to the light-receiving unit.

The auto-focusing method may further include measuring an intensity and a wavelength of the split light by using the light-receiving unit; and comparing the intensity and the wavelength of the split light with the intensity and wavelength of the reflected light to determine whether there is noise in the reflected light.

The auto-focusing apparatus may automatically focus light onto the pixel unit when the organic light-emitting display apparatus is in a state where the organic light-emitting device does not emit light.

BRIEF DESCRIPTION OF THE DRAWINGS

The embodiments will become apparent by describing in detail exemplary embodiments thereof with reference to the attached drawings in which.

DETAILED DESCRIPTION

Figure 1:
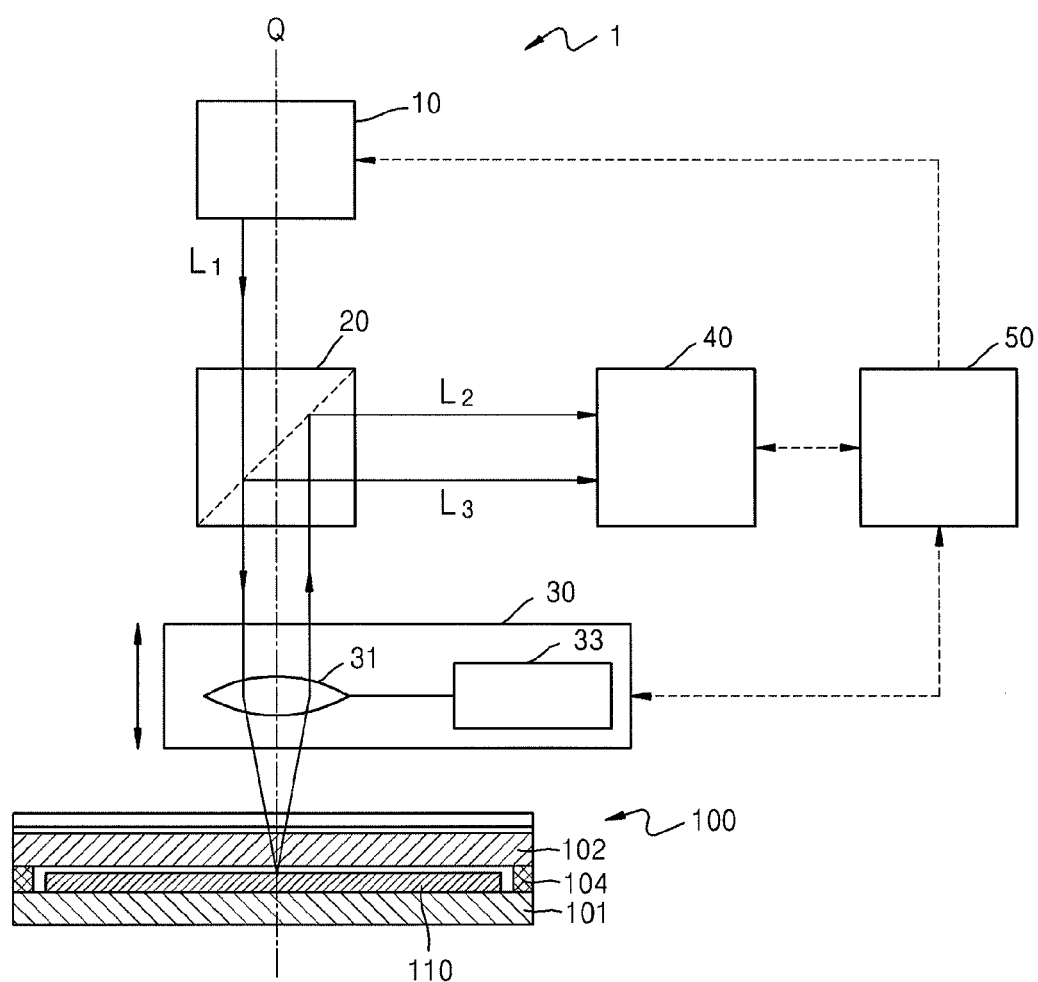
FIG. 1 illustrates a schematic view of an auto-focusing apparatus according to an embodiment.

As the invention allows for various changes and numerous embodiments, exemplary embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe exemplary embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention will now be described more fully with reference to the accompanying drawings, in which exemplary embodiments of the invention are shown.

FIG. 1 illustrates a schematic view of an auto-focusing apparatus 1 according to an embodiment.

Referring to FIG. 1, the auto-focusing apparatus 1 may be used in auto-focusing or testing of an organic light-emitting display apparatus 100.

The organic light-emitting display apparatus 100 may include an upper panel 102 and a lower panel 101. The upper panel 102 and the lower panel 101 may be bonded to each other by a sealing member 104. A pixel unit 110 (including organic light-emitting devices (not shown)) may be disposed on the lower panel 101. The pixel unit 110 may include a plurality of pixels, wherein each of the plurality of pixels includes an organic light-emitting device. The organic light-emitting device may include a pixel electrode, an opposite electrode, and an intermediate layer interposed between the pixel electrode and the opposite electrode. The intermediate layer may include various organic layers, e.g., a hole injection layer, a hole transport layer, an electron injection layer, an electron transport layer, and the like, as well as an emission layer formed of an organic material. The organic light-emitting device may emit red light, green light, or blue light according to the type of emission layer.

The organic light-emitting device of the organic light-emitting display apparatus 100 according to an embodiment may employ a resonant structure. In this regard, the resonant structure may refer to a structure that improves optical extraction efficiency of the organic light-emitting device by adjusting an optical resonant distance of the organic light-emitting device. The optical resonant distance may vary according to the types of emitted light. Thus, red pixels, green pixels, and blue pixels of the pixel unit 110 may have different optical distances. Various types of resonant structures may be implemented, e.g., a metal mirror type resonant structure, a dielectric mirror type resonant structure, and the like. The metal mirror type resonant structure and the dielectric mirror type resonant structure will be described briefly. However, the resonant structure may be implemented in a different, e.g., well-known manner, from the manner described above.

First, in the metal mirror type resonant structure, a distance between a reflective electrode and a semi-transmissive electrode may be adjusted as an optical resonant distance. In this regard, the reflective electrode and the semi-transmissive electrode may be a pixel electrode and an opposite electrode, respectively. For example, by adjusting thicknesses of various organic layers interposed between the reflective electrode and the semi-transmissive electrode, or by adjusting a thickness of the reflective electrode or the semi-transmissive electrode, or by forming an auxiliary electrode on the reflective electrode or the semi-transmissive electrode, the distance between the reflective electrode and the semi-transmissive electrode may be adjusted as the optical resonant distance. In the dielectric mirror type resonant structure, by adjusting a thickness of an insulating layer formed under the organic light-emitting device, the optical resonant distance of the organic light-emitting device may be adjusted. For example, the organic light-emitting device may be formed on an insulating layer formed of an organic material or an inorganic material. In this regard, the insulating layer may reflect or refract a part of light. Thus, by adjusting the thickness of the insulating layer, the optical resonant distance of light emitted from the organic light-emitting device may be adjusted.

In the resonant structure, light irradiated by an external light source on the organic light-emitting device, as well as light emitted from the emission layer of the organic light-emitting device, may be resonant. The auto-focusing apparatus 1 illustrated in FIG. 1 may automatically focus light onto the pixel unit 110 of the organic light-emitting display apparatus 100 by using characteristics that intensity of emitted light increases due to the resonant structure of the organic light-emitting device.

The auto-focusing apparatus 1 may include an emission unit 10 that irradiates light, an optical system 30 that focuses light onto a subject, a light-receiving unit 40 that receives light reflected from the subject and measures an intensity of light, and a controller 50 that controls the emission unit 10, the optical system 30, and the light-receiving unit 40. The auto-focusing apparatus 1 may further include an optical path conversion unit 20 that changes a path of reflected light, or an optical splitter 20 that splits a part of light irradiated by the emission unit 10.

The emission unit 10 may irradiate light on the organic light-emitting display apparatus 100 and may include a laser generator or a light emitting diode (LED) device. Thus, light may be a laser beam or LED light. In addition, light emitted from the emission unit 10 may have a wavelength in a red region or a wavelength in a blue region.

As described above, there may be at least three types of organic light-emitting devices, e.g., for emitting red light, blue light, and green light, respectively. In this regard, an optical resonant distance of an organic light-emitting device that emits red light may be relatively larger than optical resonant distances of an organic light-emitting device that emits blue light and an organic light-emitting device that emits green light. An optical resonant distance of the organic light-emitting device that emits blue light may be relatively smaller than optical resonant distances of the organic light-emitting device that emits red light and the organic light-emitting device that emits green light. Thus, light irradiated by the emission unit 10 may have a wavelength in the red region that corresponds to the maximum optical resonant distance or a wavelength in the blue region that corresponds to the minimum optical resonant distance so that the resonant structure may be more efficiently utilized.

The optical system 30 may be located between the organic light-emitting display apparatus 100 and the emission unit 10 and may focus light irradiated by the emission unit 10 on the pixel unit 110. The optical system 30 may include an objective lens 31 and a lens movement unit 33 that adjusts a position of the objective lens 31 on an optical axis Q upwardly and downwardly. The lens movement unit 33 may be controlled by the controller 50 that will be described below. For example, light irradiated by the emission unit 10 may be focused on a predetermined portion of the organic light-emitting display apparatus 100 while passing through the objective lens 31. For example, light may be focused on optical members 105 (see FIG. 2) or the pixel unit 110 of the optical light-emitting display apparatus 100. In the auto-focusing apparatus 1 that focuses light irradiated by the emission unit 10 on the pixel unit 110, whether light is focused on the pixel unit 110 may be determined based on an intensity of light that is reflected by an element on which emitted light is focused and is received by the light-receiving unit 40, as will be described below in detail.

The light-receiving unit 40 may receive light that is focused on a predetermined portion of the organic light-emitting display apparatus 100 via the optical system 30 and is reflected thereon or therefrom. In addition, the light-receiving unit 40 may measure an intensity and wavelength of received light. The light-receiving unit 40 may not be located on the optical axis Q. In this regard, the auto-focusing apparatus 1 may further include the optical path conversion unit 20 that changes a path of light so as to transfer reflected light to the light-receiving unit 40.

The optical path conversion unit 20 may be located on the optical axis Q between the optical system 30 and the emission unit 10 and may change the path of reflected light into a direction desired by a user. For example, the optical path conversion unit 20 may include a reflector or a beam splitter.

The controller 50 may control the emission unit 10, the optical system 30, and the light-receiving unit 40 of the auto-focusing apparatus 1. For example, the controller 50 may control the emission unit 10 to emit light at a predetermined time interval. In addition, the controller 50 may control the light-receiving unit 40 to receive the intensity of light measured by the light-receiving unit 40 and thus may check a position of the objective lens 31 focusing light onto the pixel unit 110 to determine the position of the objective lens 31 as an optimal focal length.

An order for operating the auto-focusing apparatus 1 will be described based on an order of movement of light with reference to FIG. 1. First, the operating order of the auto-focusing apparatus 1 may include operations: emitting light L1 from the emission unit 10; focusing the emitted light L1 on the pixel unit 110 or the optical members 105 of FIG. 2 while the emitted light L1 passes through the optical system 30; reflecting the emitted light L1 on or from the pixel unit 110 or the optical members 105 of FIG. 2; transferring the reflected light L2 to the light-receiving unit 40; measuring the intensity and wavelength of the reflected light L2 by using the light-receiving unit 40; and determining that the auto-focusing apparatus 1 is focusing light onto only the pixel unit 110 when the intensity of the measured light L2 represents a maximum value and determining a position of the optical system 30 as an optimal focal length by using the controller 50. In this regard, the light L1 may represent light irradiated by the emission unit 10; and the light L2 may represent light reflected by the organic light-emitting display apparatus 100. Light L3 illustrated in FIG. 1 may represent light divided by the optical splitter 20, as will be described below in detail.

Figure 2:
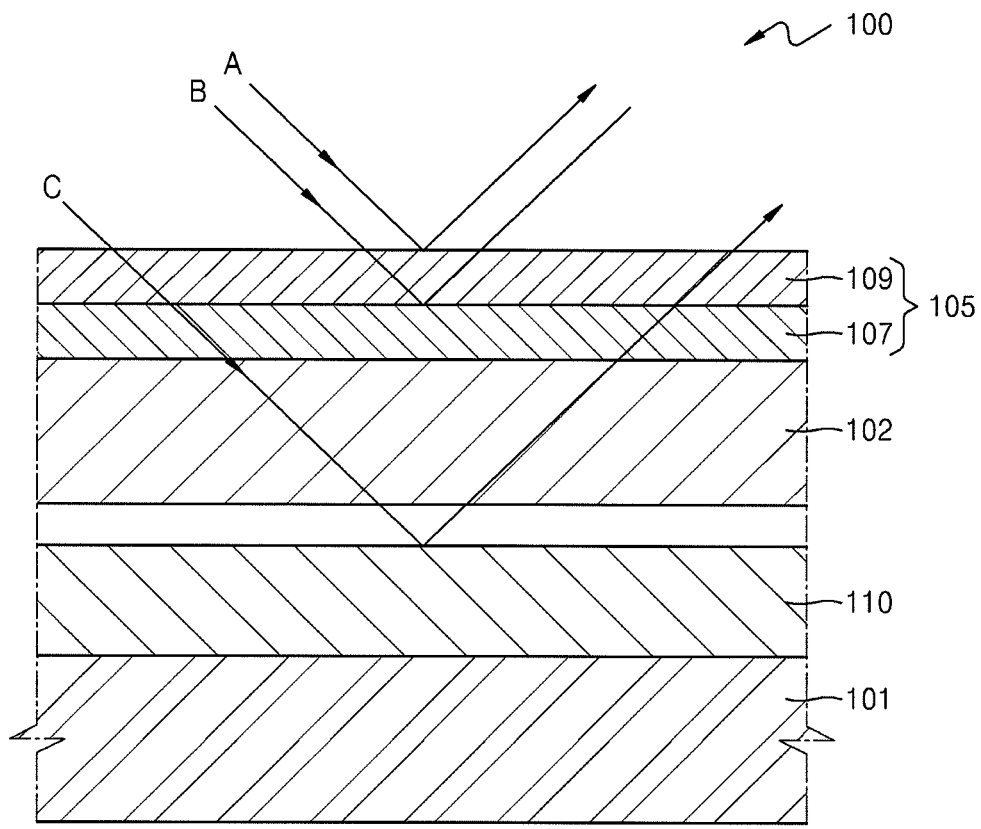
FIG. 2 illustrates a case where emitted light is reflected from various elements of an organic light-emitting display apparatus.
Figure 3:
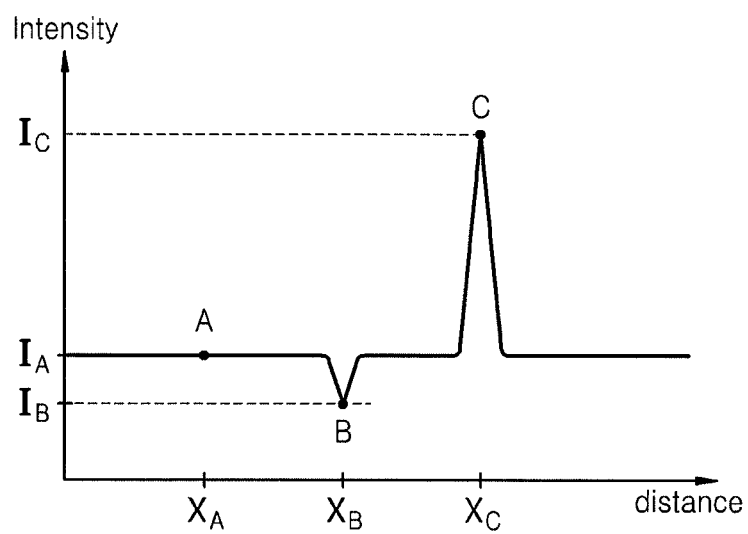
FIG. 3 illustrates a graph showing intensity of reflected light illustrated in FIG. 2 with respect to a position of an optical system.

FIG. 2 illustrates a case where emitted light is reflected by various elements of the organic light-emitting display apparatus 100 illustrated in FIG. 1. FIG. 3 illustrates a graph showing intensity of reflected light illustrated in FIG. 2 with respect to a position of the optical system 30. An operation of determining an optimal focal length by using the auto-focusing apparatus 1 will be described with reference to FIGS. 2 and 3.

Referring to FIG. 2, a portion of the organic light-emitting display apparatus 100 is enlarged. The organic light-emitting display apparatus 100 may include the pixel unit 110 formed on the lower panel 101, the upper panel 102 disposed above the lower panel 101 so as to cover the pixel unit 110, and various optical members 105 formed on the upper panel 102. For example, a polarization member 107 that absorbs reflected light and efficiently transfers light emitted from the pixel unit 110 to a user, such as a circular polarization member or a linear polarization member, may be disposed on the upper panel 102. A cover member 109 that protects the organic light-emitting display apparatus 100 from external damage, such as a window, may be further disposed on the polarization member 107.

The auto-focusing apparatus 1 may be used to automatically focus light onto the pixel unit 110 of the organic light-emitting display apparatus 100 that is a finished product having the optical members 105 disposed on the organic light-emitting display apparatus 100. However, embodiments are not limited thereto. The auto-focusing apparatus 1 may also be used to automatically focus light onto the pixel unit 110 of the organic light-emitting display apparatus 100 that is a semi-finished product having no optical members 105 disposed on the organic light-emitting display apparatus 100.

When optical members 105 are further disposed above the pixel unit 110, a position of light irradiated by the emission unit 10 to be focused may be changed according to a position of the objective lens 31 and may be reflected on or from the pixel unit 110 or the other optical members 105. For example, in FIG. 2, light A may be reflected by the cover member 109, light B may be reflected by the polarization member 107, and only light C may be accurately focused on the pixel unit 110 and may be reflected by the pixel unit 110.

A relationship between the result of measuring the intensity of light A, light B, and light C shown in FIG. 2 that are reflected and then are transferred to the light-receiving unit 40 and the position of the optical system 30, i.e., the objective lens 31 is shown in FIG. 3. Referring to FIG. 3, when the optical system 30 is at a position $X_A$, light may be focused on the cover member 109, and the intensity of the reflected light A may be measured as $I_A$. When the optical system 30 is at a position $X_B$, light may be focused on the polarization 107, and the intensity of reflected light B may be measured as $I_B$. When the optical system 30 is at a position $X_C$, light may be focused on the pixel unit 110 and the intensity of reflected light C may be measured as $I_C$.

Referring to FIG. 3, when light is focused on the pixel unit 110, the maximum intensity of light may be measured, and the position of the optical system 30 may be an optimal focal length. This is because the pixel unit 110 may include an organic light-emitting device employing a resonant structure. In addition, as described above, since the resonant structure maximizes optical efficiency and increases the intensity of light, light reflected on the pixel unit 110 may be resonant and may have increased intensity. Thus, the controller 50 may determine that light is focused on the pixel unit 110 when the optical system 30 is at a position where the intensity of reflected light is a maximum value. Thus, the controller 50 may determine the position of the optical system 30 as an optimal focal length. When light is focused on the cover member 109, light may not be resonant and thus the intensity of light measured may not be large. In addition, when light is focused on the polarization member 107, the polarization member 107 may absorb a part of light and thus the intensity of light measured may not be large.

In order to focus only light emitted by the emission unit 10 on the pixel unit 110 by using the auto-focusing apparatus 1, the organic light-emitting display apparatus 100 may have to be turned off. For example, when the organic light-emitting device of the organic light-emitting display apparatus 100 does not emit light, i.e., when the pixel unit 110 does not emit light, only light emitted by the auto-focusing apparatus 1 may be focused on the pixel unit 110.

However, the embodiments are not limited thereto. The auto-focusing apparatus 1 may be used even when the organic light-emitting display apparatus 100 is turned on. In this regard, light emitted from the organic light-emitting device and light irradiated by the emission unit 10 of the auto-focusing apparatus 1 and reflected may be received by the light-receiving unit 40. In this regard, for convenience of analysis, only a component of light irradiated by the emission unit 10 and reflected among the lights received by the light-receiving unit 40 may need to be extracted. For example, light emitted from the organic light-emitting device may be regarded as noise.

The optical splitter 20 may be located between the optical system 30 and the emission unit 10 on the optical axis Q, may split the light irradiated by the emission unit 10 on the organic light-emitting display apparatus 100, and may transfer the split light to the light-receiving unit 40. The light L3 in FIG. 1 may represent light split by the optical splitter 20. The light-receiving unit 40 may measure intensity and wavelength of light transferred by the optical splitter 20. The controller 50 may receive the intensity and wavelength of the split light. The controller 50 may compare the intensity and wavelength of the split light with the intensity and wavelength of reflected light and may determine the amount of light emitted from the organic light-emitting device, which is included in the reflected light. For example, when the light emitted from the organic light-emitting device is regarded as noise, the controller 50 may recognize information about light irradiated by the emission unit 10 at an initial stage and thus may regard the light emitted from the organic light-emitting device, which is included in the reflected light, as noise.

The optical splitter 20 may be, e.g., a beam splitter. The optical splitter 20 may also be implemented separate from the optical path conversion unit 20 described above. However, the embodiments are not limited thereto. The optical splitter 20 may be integrally formed with the optical path conversion unit 20 as one body, as illustrated in FIG. 1.

Figure 4:
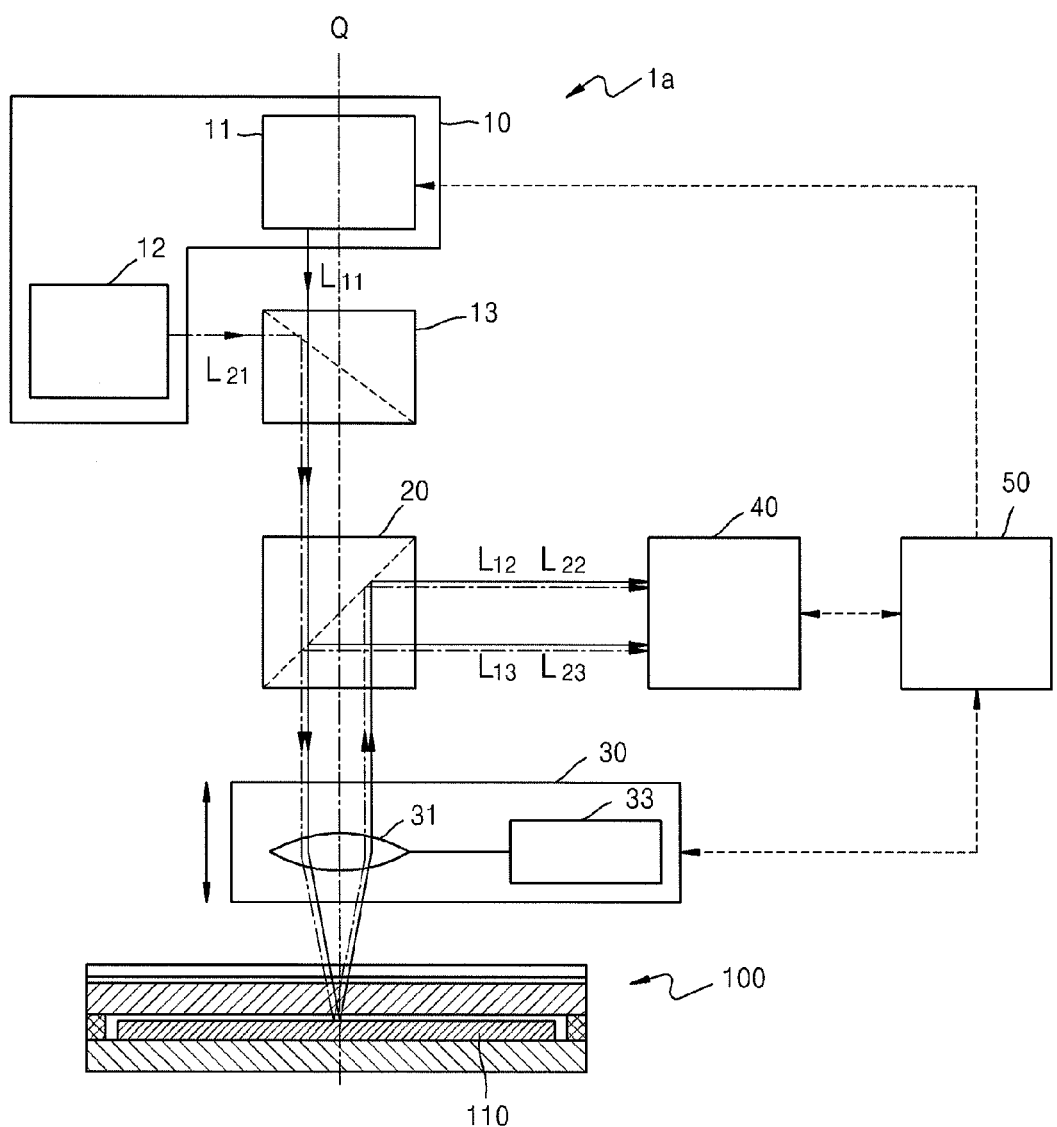
FIG. 4 illustrates a schematic view of an auto-focusing apparatus according to another embodiment.

FIG. 4 illustrates a schematic view of an auto-focusing apparatus 1a according to another embodiment.

The auto-focusing apparatus 1a illustrated in FIG. 4 is different from the auto-focusing apparatus 1 illustrated in FIG. 1 in that an emission unit 10 may include a first emission unit 11 and a second emission unit 12. Elements other than the first emission unit 11 and the second emission unit 12 may have functions that are the same as or similar to those of the elements of the auto-focusing apparatus 1 illustrated in FIG. 1 and thus a repeated detailed description thereof is omitted.

Referring to FIG. 4, the emission unit 10 may include the first emission unit 11 that emits light having a wavelength in a red region and the second emission unit 12 that emits light having a wavelength in a blue region. In this regard, the first emission unit 11 and the second emission unit 12 may emit light toward the organic light-emitting display apparatus 100 at a predetermined time interval. The time interval may be an arbitrary value determined by a user and may be programmed when the auto-focusing apparatus 1a is manufactured.

The auto-focusing apparatus 1a shown in FIG. 4 may obtain an optimal focal length more accurately based on the result of irradiating two types of light. For example, the first emission unit 11 and the second emission unit 12 of the emission unit 10 may irradiate different lights at a predetermined time interval so that the measurement result shown in FIG. 3 for each of the red light and blue light may be obtained while the result of measuring one light and the result of measuring the other light are not mixed. When two focal lengths are obtained from two different lights, if desired, the user may select only one focal length and may use the selected focal length in evaluating optical characteristics or may calculate an average or middle value of two focal lengths and may use the average or middle value of two focal lengths in evaluating optical characteristics.

In FIG. 4, the second emission unit 12 may not be located on the optical axis Q of the first light L11 irradiated by the first emission unit 11 and may be located in a direction perpendicular to the optical axis Q. However, this is for convenience of explanation, and the second emission unit 12 and the first emission unit 11 may be located on the optical axis Q. Although an auxiliary optical path conversion unit 13 that changes a path of second light L21 irradiated by the second emission unit 12 is further illustrated in FIG. 4, the auxiliary optical path conversion unit 13 may be omitted according to a user's selection.

Figure 5:
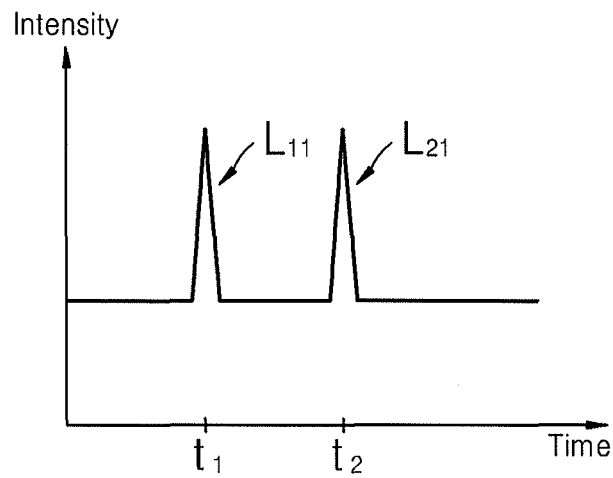
FIG. 5 illustrates a graph showing characteristics of light irradiated by an emission unit illustrated in FIG. 4.

FIG. 5 illustrates a graph showing characteristics of light irradiated by the emission unit 10 illustrated in FIG. 4.

Referring to FIG. 5, the first light L11 irradiated by the first emission unit 11 and the second light L21 irradiated by the second emission unit 12 may have the same intensity. However, the embodiments are not limited thereto. When the first light L11 and the second light L21 have the same intensity, their initial values may be the same. Thus, faster calculation for the first light L11 and the second light L21 may be performed than calculation performed when the controller 50 obtains a graph showing the intensity of light.

The first light L11 and the second light 21 may be irradiated at a predetermined time interval so as to obtain the graph shown in FIG. 3 for each of the first light L11 and the second light L21. Reference numeral L12 shown in FIG. 4 represents light obtained after the first light L11 is reflected, and reference numeral L22 shown in FIG. 4 represents light obtained after the second light L21 is reflected. Also, reference numeral L13 shown in FIG. 4 represents light obtained after the first light L11 is split, and reference numeral L23 shown in FIG. 5 represents light obtained after the second light L21 is split. The order of operating the auto-focusing apparatus 1 has already been described based on the order of movement of light. Thus, a repeated description thereof is omitted.

Figure 6:
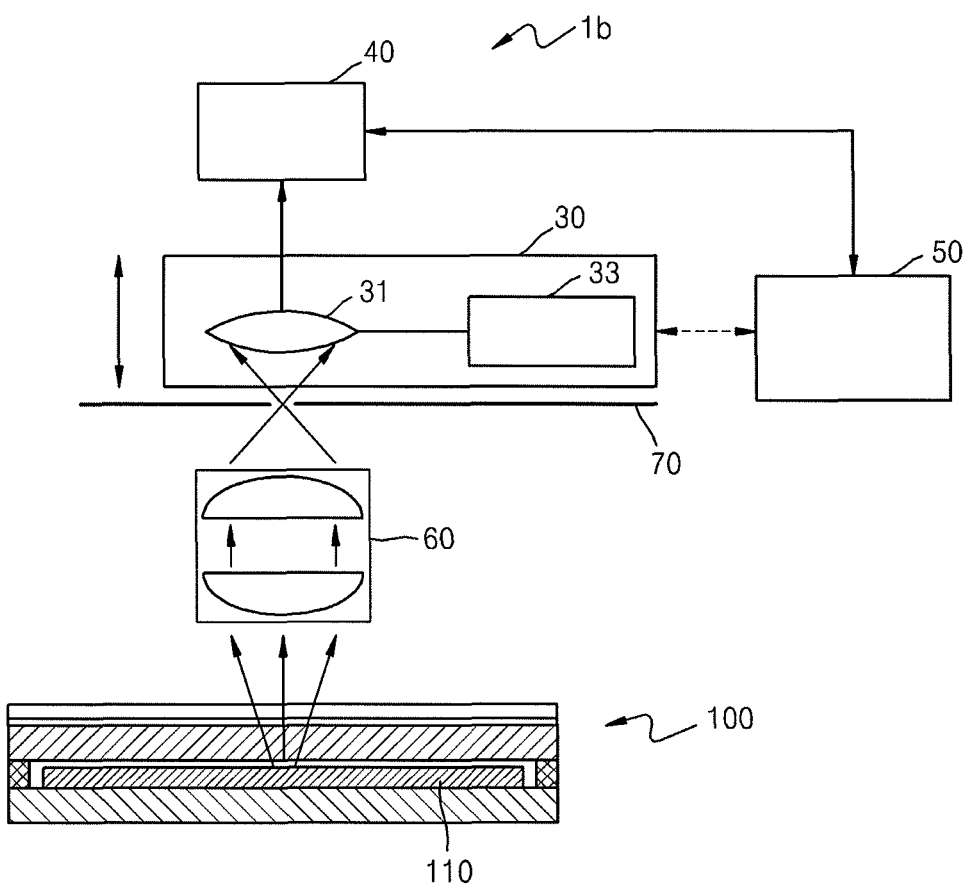
FIG. 6 illustrates a schematic view of an auto-focusing apparatus according to another embodiment.

FIG. 6 illustrates a schematic view of an auto-focusing apparatus 1b according to yet another embodiment.

Referring to FIG. 6, the auto-focusing apparatus 1b may include a light-receiving unit 40, a first optical system 30, a second optical system 60, a pin hole lens 70, and a controller 50. In this regard, the light-receiving unit 40, the first optical system 30, and the controller 50 may have functions that are the same as or similar to those of the light-receiving unit 40, the optical system 30, and the controller 50 illustrated in FIG. 1, respectively. Thus, a repeated detailed description thereof is omitted.

The auto-focusing apparatus 1b illustrated in FIG. 6 is different from the auto-focusing apparatuses 1 and 1a illustrated in FIGS. 1 and 4 in that light emitted from an organic light-emitting display apparatus 100 may be focused on a pixel unit 110. For example, the auto-focusing apparatus 1b illustrated in FIG. 6 may focus light onto the pixel unit 110 in a similar manner to auto-focusing of a photographing apparatus such as a camera.

For example, when light is emitted from the organic light-emitting display apparatus 100, the second optical system 60 including condensing lenses may condense emitted light and focuses the light onto the pin hole lens 70. The pin hole lens 70 may be similar to a diaphragm of the photographing apparatus, may allow light on a desired path to be obtained, and may remove noise. Light that has passed through the pin hole lens 70 may pass through the objective lens 31 and may be received by the light-receiving unit 40 that corresponds to an imaging device, such as a charge-coupled device (CCD) of the photographing apparatus. The light-receiving unit 40 may measure the intensity of received light. The controller 50 may determine the position of the first optical system 30 when the intensity of received light is a maximum value, as an optimal focal length. For example, the controller 50 may determine that light is focused on the pixel unit 110 when light having maximum intensity is received by the light-receiving unit 40 while the first optical system 30 moves upwardly and downwardly in a direction of the optical axis Q.

By way of summation and review, after an organic light-emitting display apparatus is manufactured, various optical characteristics thereof (such as existence of mura or dark points, measurement of a viewing angle, and the like) may be evaluated. In this regard, a light may be focused onto a pixel unit of the organic light-emitting display apparatus. An engineer may to focus light onto the pixel unit manually. However, a long focusing time may be required and measurement errors may occur according to users.

Accordingly, the embodiments provide an auto-focusing apparatus that automatically focuses light onto a pixel unit by measuring the intensity of reflected light by using a resonant structure of an organic light-emitting device and an auto-focusing method using the auto-focusing apparatus.

As described above, in an auto-focusing apparatus and an auto-focusing method using the same according to an embodiment, excessive auto-focusing time may be avoided, and light may be automatically focused on a pixel unit so that measurement errors may be reduced or prevented, regardless of users.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An auto-focusing apparatus for automatically focusing light onto a pixel unit of an organic light-emitting display apparatus in which the pixel unit includes an organic light-emitting device that employs a resonant structure, the auto-focusing apparatus comprising:
   an emission unit, the emission unit being configured to irradiate light on the organic light-emitting display apparatus;
   an optical system between the organic light-emitting display apparatus and the emission unit, the optical system being configured to adjust a position of the optical system on an optical axis and focus the irradiated light on the pixel unit;
   a light-receiving unit, the light-receiving unit being configured to receive light reflected by the organic light-emitting display apparatus and measure an intensity and a wavelength of the reflected light; and
   a controller, the controller being configured to:
      receive the intensity of light measured by the light-receiving unit,
      control the position of the optical system,
      determine that the auto-focusing apparatus is focusing light onto the pixel unit when the intensity of light received by the light-receiving unit is a maximum value, and
      determine the position of the optical system as an optimal focal length.

2. The auto-focusing apparatus of claim 1, further comprising an optical path conversion unit on the optical axis between the optical system and the emission unit, the optical path conversion unit being configured to change a path of the reflected light and transfer the light to the light-receiving unit.

3. The auto-focusing apparatus of claim 1, wherein the emission unit includes a laser generator or a light emitting diode (LED) device.

4. The auto-focusing apparatus of claim 1, wherein the emission unit is configured to irradiate light having a wavelength in a red region or light having a wavelength in a blue region.

5. The auto-focusing apparatus of claim 1, wherein:
   the emission unit includes:
      a first emission unit configured to irradiate light having a wavelength in a red region; and
      a second emission unit configured to irradiate light having a wavelength in a blue region, and the first emission unit and the second emission unit are configured to irradiate light on the organic light-emitting display apparatus at a predetermined time interval.

6. The auto-focusing apparatus of claim 1, wherein:
the optical system includes an objective lens and a lens movement unit that is configured to adjust a position of the objective lens, and
the controller is configured to control the lens movement unit to control the position of the objective lens.

7. The auto-focusing apparatus of claim 1, further comprising an optical splitter on the optical axis between the optical system and the emission unit, the optical splitter being configured to split light irradiated by the emission unit and transfer the split light to the light-receiving unit.

8. The auto-focusing apparatus of claim 7, wherein:
the light-receiving unit is configured to measure an intensity and a wavelength of the split light, and
the controller is configured to receive the intensity and wavelength of the split light measured by the light-receiving unit and compare the intensity and wavelength of the split light with the intensity and wavelength of the reflected light to determine whether there is noise in the reflected light.

9. The auto-focusing apparatus of claim 1, wherein the auto-focusing apparatus is configured to automatically focus light onto the pixel unit when the organic light-emitting display apparatus is in a state where the organic light-emitting device does not emit light.

10. The auto-focusing apparatus of claim 1, wherein the organic light-emitting display apparatus further includes at least one optical member on the pixel unit.

11. An auto-focusing method using an auto-focusing apparatus for automatically focusing light onto a pixel unit of an organic light-emitting display apparatus in which the pixel unit includes an organic light-emitting device that employs a resonant structure, the auto-focusing method comprising:
irradiating light on the organic light-emitting display apparatus such that the irradiating is performed by an emission unit;
focusing the irradiated light onto the pixel unit while the irradiated light passes through an optical system;
reflecting the irradiated light on the organic light-emitting display apparatus;
transferring the reflected light to a light-receiving unit;
receiving the reflected light and measuring an intensity and a wavelength of the reflected light such that the receiving and the measuring is performed by the light-receiving unit; and
determining that the auto-focusing apparatus is focusing light onto the pixel unit when the intensity of received light measured by the light-receiving unit is a maximum value and determining a position of the optical system as an optimal focal length.

12. The auto-focusing method of claim 11, wherein transferring the reflected light to the light-receiving unit includes changing a path of the reflected light by using an optical path conversion unit.

13. The auto-focusing method of claim 11, wherein light irradiated by the emission unit has a wavelength in a red region or has a wavelength in a blue region.

14. The auto-focusing method of claim 11, wherein:
a first emission unit of the emission unit irradiates light having a wavelength in a red region;
a second emission unit of the emission unit irradiates light having a wavelength in a blue region, and
the first emission unit and the second emission unit irradiate light on the organic light-emitting display apparatus at a predetermined time interval.

15. The auto-focusing method of claim 11, further comprising splitting light irradiated by the emission unit and transferring the split light to the light-receiving unit.

16. The auto-focusing method of claim 15, further comprising:
measuring an intensity and a wavelength of the split light by using the light-receiving unit; and
comparing the intensity and the wavelength of the split light with the intensity and wavelength of the reflected light to determine whether there is noise in the reflected light.

17. The auto-focusing method of claim 11, wherein the auto-focusing apparatus automatically focuses light onto the pixel unit when the organic light-emitting display apparatus is in a state where the organic light-emitting device does not emit light.

* * * * *